(12) United States Patent
Zhu et al.

(10) Patent No.: US 11,555,988 B2
(45) Date of Patent: Jan. 17, 2023

(54) NONSYMMETRIC FREEFORM SURFACE OPTICAL SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Yi-Lin Tan, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 30 days.

(21) Appl. No.: 17/350,230

(22) Filed: Jun. 17, 2021

(65) Prior Publication Data
US 2022/0252853 A1   Aug. 11, 2022

(30) Foreign Application Priority Data

Feb. 5, 2021   (CN) .......................... 202110164559.8

(51) Int. Cl.
*G02B 17/06*   (2006.01)

(52) U.S. Cl.
CPC .................................. *G02B 17/06* (2013.01)

(58) Field of Classification Search
CPC ....................................................... G02B 17/06
See application file for complete search history.

(56) References Cited

U.S. PATENT DOCUMENTS

2018/0180898 A1* 6/2018 Zhu ........................ G02B 27/64

\* cited by examiner

*Primary Examiner* — Robert E. Tallman
(74) *Attorney, Agent, or Firm* — ScienBiziP, P.C.

(57) ABSTRACT

The present application relates to a nonsymmetric freeform surface optical system including a primary reflecting mirror, a secondary reflecting mirror, and a tertiary reflecting mirror. A light beam from an object is reflected on the primary reflecting mirror to form a first reflected light beam, the first reflected light beam irradiates the secondary reflecting mirror and is reflected to form a second reflected light beam, the second reflected light beam irradiates the third reflecting mirror and is reflected to form a third reflected light beam, and the third reflected light beam reaches an image surface to form an image. The nonsymmetric freeform surface optical system has no rotational symmetry and no meridional symmetry.

15 Claims, 8 Drawing Sheets

| establishing an initial plane system, wherein the initial plane system is consistent with the expected system structure, but there is no focal power in the initial plane system, and the image plane tilt angle of the initial plane system is defined as θ | —S10 |

| using the point-by-point method to calculate the coordinates and normal vectors of the data points used to construct the freeform surface, and iterating to obtain the iterated optical system | —S20 |

| optimizing the iterated optical system | —S30 |

FIG. 15 ial systems, and how to design a new optical system to make
NONSYMMETRIC FREEFORM SURFACE OPTICAL SYSTEM

CROSS-REFERENCE TO RELATED APPLICATIONS

This application is related to commonly-assigned application entitled, "METHOD FOR DESIGNING NONSYMMETRIC FREEFORM SURFACE OPTICAL SYSTEM", concurrently filed (Ser. No. 17/350,217). The entire contents of which are incorporated herein by reference.

FIELD

The present application relates to the field of optics technology, in particular to a freeform surface optical system.

BACKGROUND

The coaxial optical system and off-axis meridian symmetric optical system are currently the main design objects in the field of optical technology, and there are now mature products and design methods. The coaxial optical system and the off-axis meridian symmetric optical system can meet most of the requirements in the imaging field. However, for some occasions where space is limited or the shape of the space is limited, sufficient space cannot be allocated to the coaxial optical system. In addition, the coaxial reflection system also has defects, such as a central obstruction, a usable central field of view with good image quality is small. The common way to solve the above two deficiencies is to use an off-axis system. Furthermore, if the space for accommodating the optical system is limited and the shape of the space is not symmetrical, it is difficult to fit the common coaxial optical system and off-axis meridian optical system into the space.

Therefore, how to improve the design freedom of optical systems, and how to design a new optical system to make full use of the limited physical space, are urgent problems in the field of optical technology.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A nonsymmetric freeform surface optical system of a first embodiment is provided. The nonsymmetric freeform surface optical system is an optical system that has neither rotational symmetry nor meridional symmetry.

Figure 1:
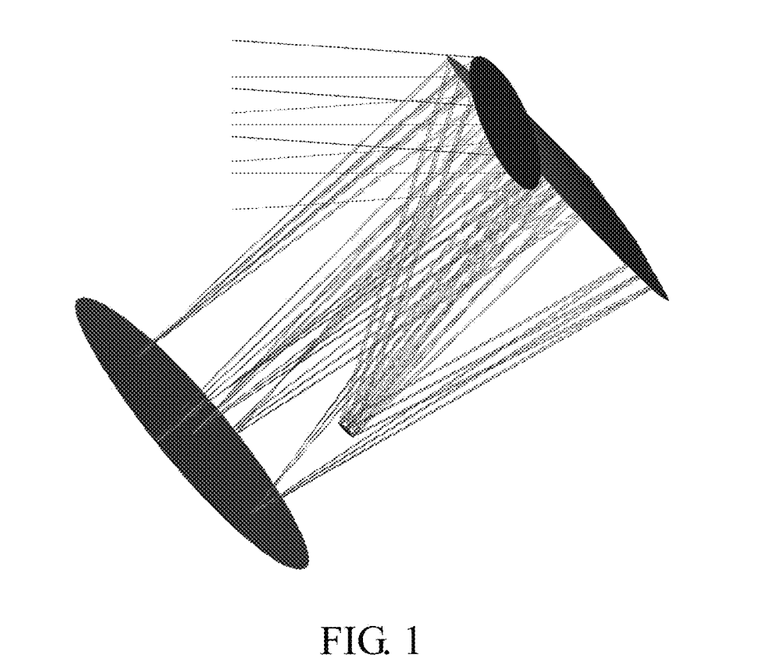
FIG. 1 shows a schematic view of a nonsymmetric freeform surface optical system of a first embodiment.
Figure 2:
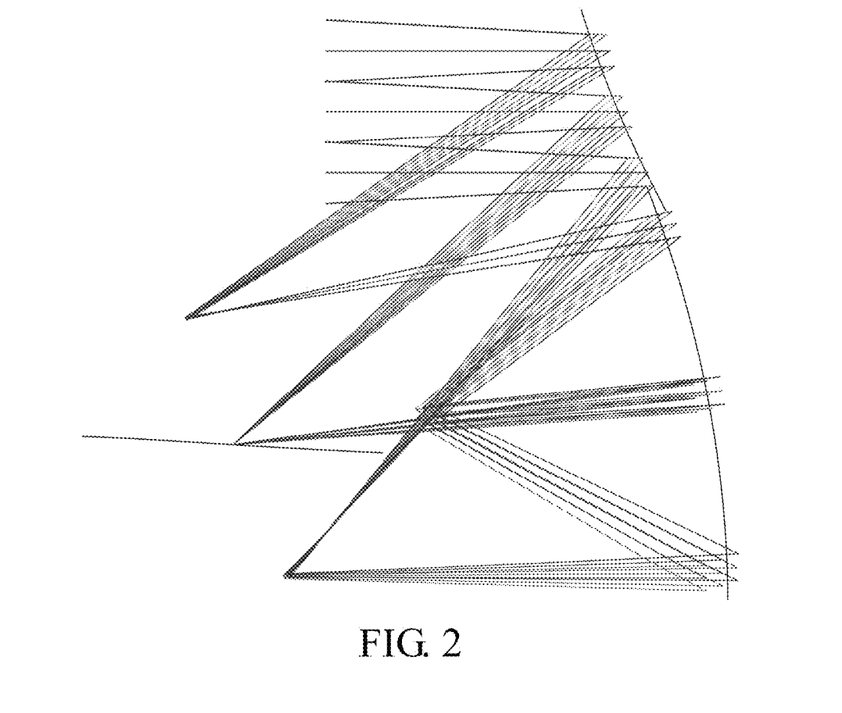
FIG. 2 shows a schematic YZ view of an optical path of the nonsymmetric freeform surface optical system of the first embodiment.
Figure 3:
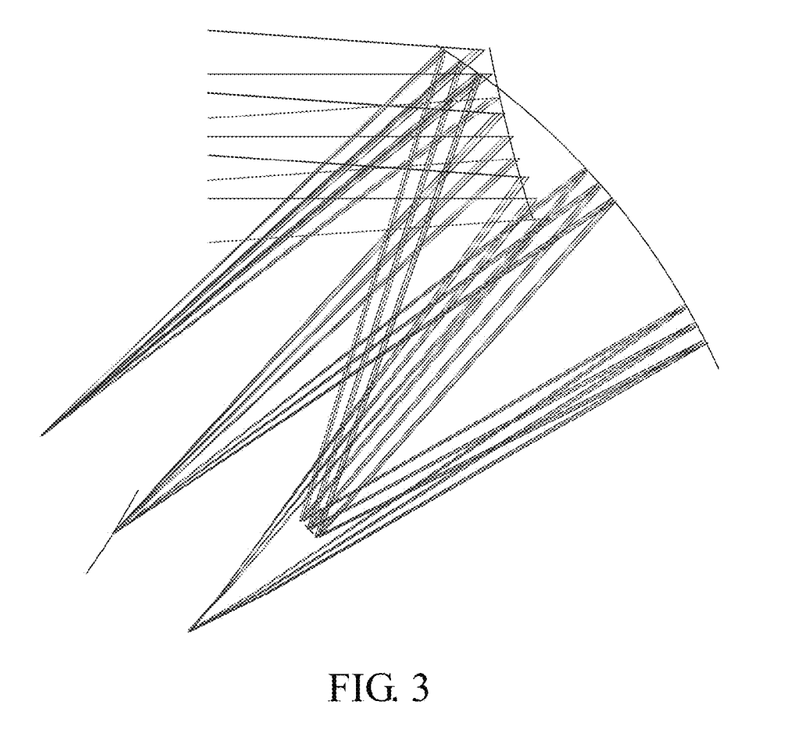
FIG. 3 shows a schematic XZ view of the optical path of the nonsymmetric freeform surface optical system of the first embodiment.

Referring to FIGS. 1 to 3, the nonsymmetric freeform surface optical system 100 includes a primary reflecting mirror 102, a secondary reflecting mirror 104, and a tertiary reflecting mirror 106. The light from the object is reflected on the primary reflecting mirror 102 to form a first reflected light beam. The first reflected light beam irradiates the secondary reflecting mirror 104 and is reflected to form a second reflected light beam. The second reflected light beam irradiates the third reflecting mirror 106 and is reflected to form a third reflected light beam, and the third reflected light beam reaches the image surface 110 to form an image.

The nonsymmetric freeform surface optical system 100 has no rotational symmetry, that is, the mirror surfaces of the primary reflecting mirror 102, the secondary reflecting mirror 104, and the tertiary reflecting mirror 106 have no rotational symmetry axis. In addition, the nonsymmetric freeform surface optical system 100 also has no meridional symmetry, that is, the mirror surfaces of the primary reflecting mirror 102, the secondary reflecting mirror 104, and the tertiary reflecting mirror 106 do not have a meridian symmetry plane.

In FIGS. 2 and 3, the scales of the YZ view and the XZ view of the nonsymmetric freeform surface optical system 100 are the same. Under the same scale, it can be seen that the dimension of the nonsymmetric freeform surface optical system 100 in the X direction is 200 mm, the dimension of the nonsymmetric freeform surface optical system 100 in the Y direction is 180 mm, and the dimension of the nonsymmetric freeform surface optical system 100 in the Z direction is 180 mm. Thus, the dimensions of the nonsymmetric freeform surface optical system 100 in the three directions of XYZ are substantially the same. However, the dimensions of the traditional off-axis three-mirror system in the three directions of XYZ are different from each other, and the dimension of the traditional off-axis three-mirror system in one direction is significantly larger. It can be seen from FIG. 1 that the light beam in the nonsymmetric freeform surface optical system 100 is three-dimensionally deflected, which is more compact than the meridian symmetrical off-axis optical system that only uses two-dimensional optical path folding. In addition, the structure of the nonsymmetric freeform surface optical system 100 is a new off-axis three-mirror structure with a 45° β tilt on the image surface. The image surface and the center of the secondary reflecting mirror 104 have a certain distance in both the X direction and the Y direction, and there is also a difference between the two tilt angles, which is beneficial to the installation of the detector and has engineering application value. The specific parameters of the nonsymmetric freeform surface optical system 100 are shown in Table 1.

TABLE 1 parameters of the nonsymmetric freeform surface optical system 100

| parameter | numerical value |
| --- | --- |
| field of view (FOV) | 8° × 6° |
| F-number | 1.3 |
| effective focal length | 50 mm |
| entrance pupil diameter | 38.5 mm |
| working wavelength | LWIR(8 μm–14 μm) |
| resolution of detector | 400 × 300 @ 17 μm |
| position of image surface | 45° β tilt |

The normal direction of the image surface of the traditional symmetrical off-axis optical system is located in the meridian plane, while the normal direction of the image surface of the nonsymmetric freeform surface optical system 100 of this embodiment is outside the meridian plane, and the image surface of the nonsymmetric freeform surface optical system 100 has the 45° β tilt. The nonsymmetric freeform surface optical system 100 is not only off-axis inside of the meridian plane, but also off-axis inside of the sagittal plane, so that the light beam in the system can be three-dimensionally deflected. In addition, the nonsymmetric freeform surface optical system 100 also has a small F-number of 1.3 and a relatively large angle of view.

Compared with the existing symmetrical optical system, the nonsymmetric freeform surface optical system 100 provided by the first embodiment has fewer constraints on the spatial position of the curved surface, which makes it possible to design an optical system with a special spatial structure. The light beam in the nonsymmetric freeform surface optical system 100 is three-dimensionally deflected, which is more compact than the meridian-symmetric off-axis optical system that only uses two-dimensional optical path folding, and can be fitted into the physical space of the smaller or special structure (such as non-meridian symmetrical structure). The nonsymmetric freeform surface optical system 100 can be designed by a point-by-point direct design method of the freeform surface.

Figure 4:
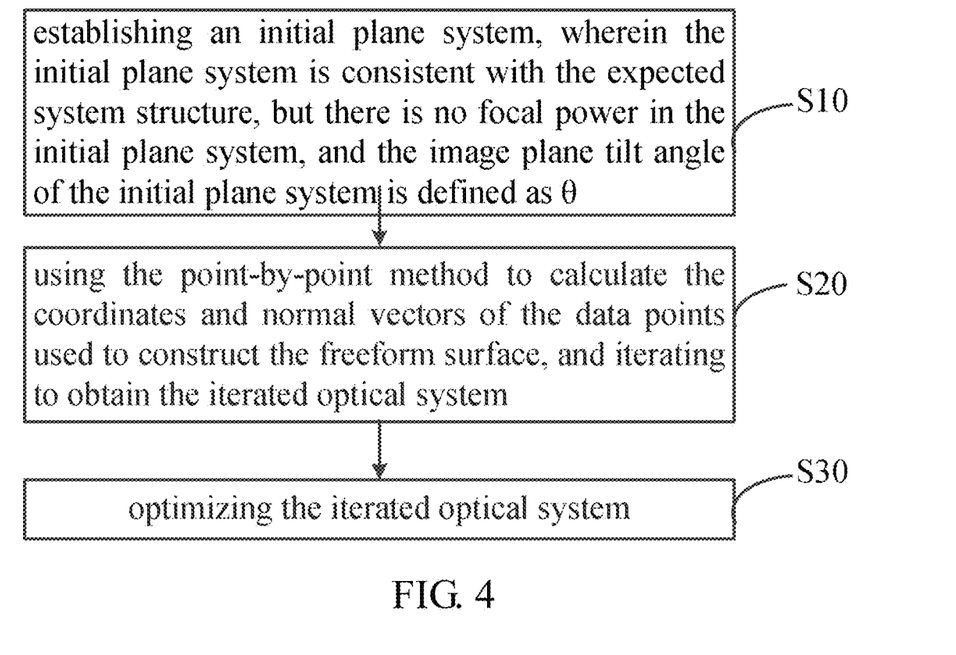
FIG. 4 shows a process flow of a method for designing the nonsymmetric freeform surface optical system of a second embodiment.

Referring to FIG. 4, a method for designing the nonsymmetric freeform surface optical system 100 of a second embodiment is provided, and the method includes the following steps:

S10, establishing an initial plane system, wherein the initial plane system is consistent with the expected system structure, but there is no focal power in the initial plane system, and the image plane tilt angle of the initial plane system is defined as θ;

S20, using the point-by-point method to calculate the coordinates and normal vectors of the data points used to construct the freeform surface, and iterating to obtain the iterated optical system; and S30, optimizing the iterated optical system.

For ease of description, in this embodiment, the parameters in Table 2 are taken as an example to design the nonsymmetric freeform surface optical system 100.

TABLE 2 parameters of the nonsymmetric freeform surface optical system 100 to be designed

| parameter | numerical value |
| --- | --- |
| field of view (FOV) | 8° × 6° |
| F-number | 1.3 |
| effective focal length | 50 mm |
| entrance pupil diameter | 38.5 mm |
| working wavelength | LWIR(8 μm–14 μm) |
| resolution of detector | 400 × 300 @ 17 μm |
| position of image surface | 45° β tilt |

During step S10, the structure of the initial plane system and the optimized starting point after construction are structurally consistent. The initial plane system that is consistent with the expected system structure is established, but the initial plane system has no focal power. The initial plane system has no symmetry, and the position of the image plane meets the requirements in Table 2.

Due to the complex spatial structure of the initial plane system without symmetry, especially to ensure that the initial plane system can be constructed and iterated to obtain a convergent result, it is difficult to directly establish the initial plane system without symmetry. The method for establishing the initial plane system without symmetry includes following steps:

S11, establishing a meridian symmetrical off-axis three-mirror system; and

S12, adjusting the decenter and tilt of the plane on the basis of the meridian symmetrical off-axis three-mirror system, and gradually eliminating the light obstruction and rotating the image plane by 45° around the y-axis of the local coordinate system.

Figure 5:
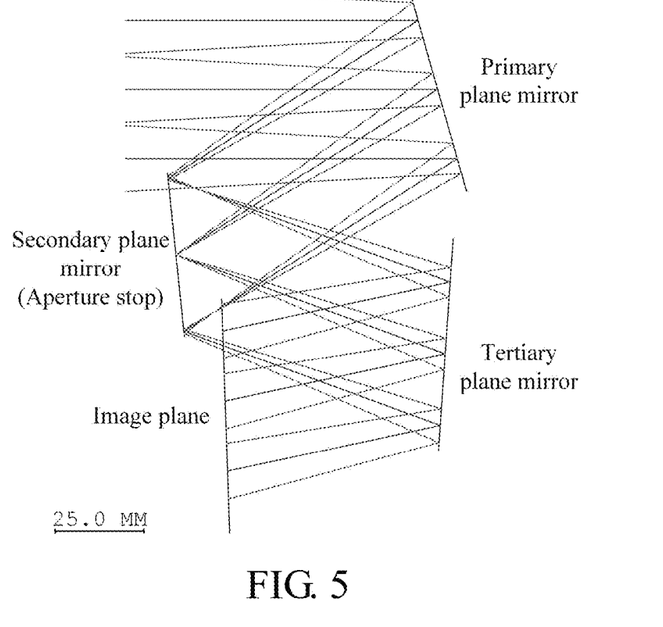
FIG. 5 shows a schematic YZ view of an optical path of a meridian symmetrical off-axis three-mirror system of the second embodiment.

During step S11, the meridian symmetrical off-axis three-mirror system has been studied at present, and a meridian symmetrical off-axis three-mirror system with a small obstruction can be established. The YZ view of the meridian symmetrical off-axis three-mirror system is shown in FIG. 5, and the aperture stop (AS) is located on the secondary reflecting mirror 104.

Figure 6:
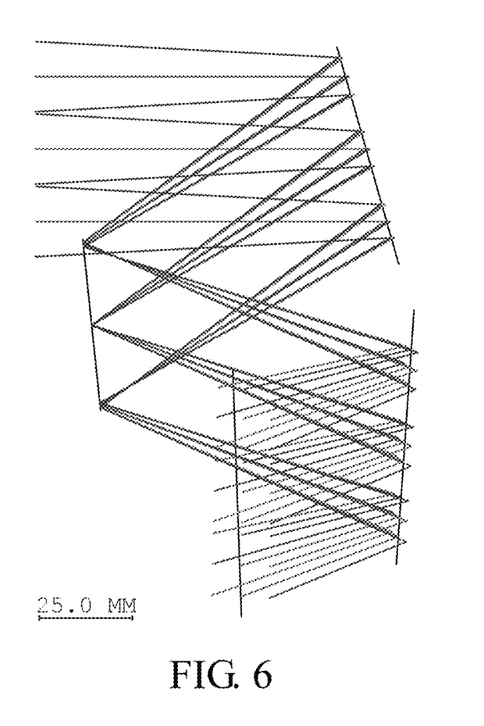
FIG. 6 shows a schematic YZ view of an optical path of an initial plane system established in the second embodiment.
Figure 7:
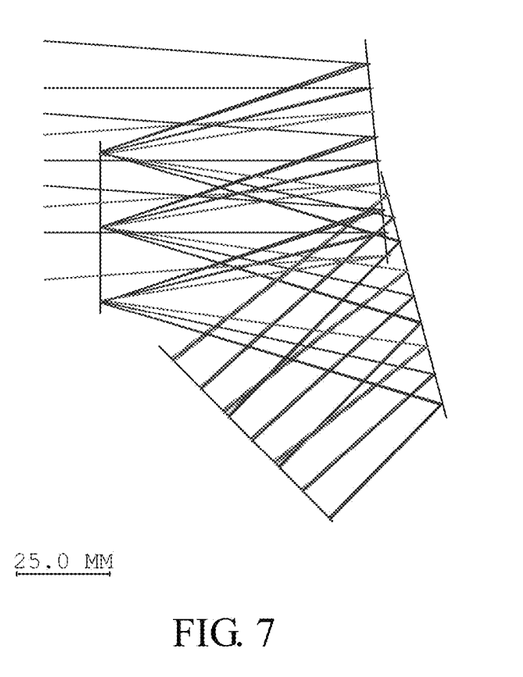
FIG. 7 shows a schematic XZ view of the optical path of the initial plane system established in the second embodiment.
Figure 8:
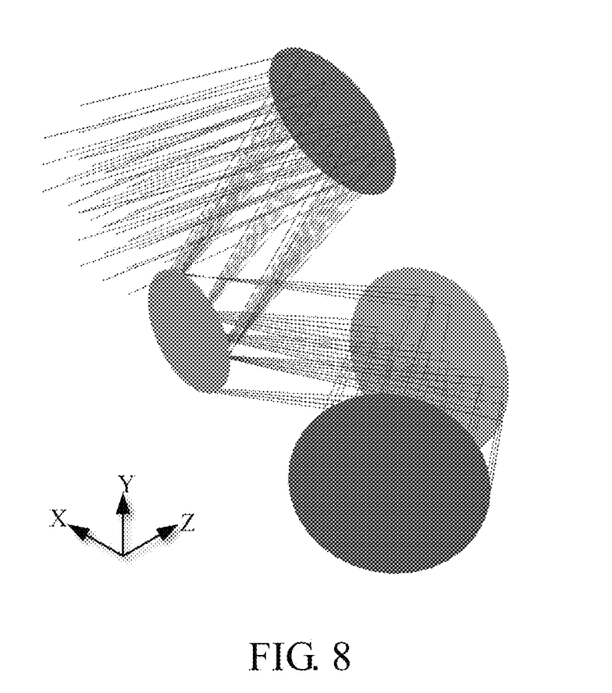
FIG. 8 shows a schematic view of the initial plane system established in the second embodiment.

During step S12, in order to make full use of the characteristics of the flexibility of the curved surface position, the optical path is folded as much as possible to reduce the volume of the meridian symmetrical off-axis three-mirror system when adjusting the curved surface position. In addition, during the adjustment process, it is ensured that the chief rays of the central field of view are substantially incident on the central area of each plane. The initial plane system established after the above adjustments is shown in FIGS. 6-8. FIG. 6 and FIG. 7 are the YZ view and XZ view of the initial plane system, respectively, and the scales of the FIG. 6 and FIG. 7 are the same. From FIG. 6 and FIG. 7, it can be seen that the dimensions of the new off-axis three-mirror initial plane system are substantially equal to each other in the X direction, the Y direction, and the Z direction. FIG. 8 is a three-dimensional view of the initial plane system. As shown in FIG. 8, the initial plane system is completely nonsymmetric and the image plane has a β tilt angle of 45°.

The step S20 further include the following steps:

S21, defining characteristic light rays, and selecting light rays with different entrance pupil coordinates in multiple fields of view for point-by-point calculation:

S22, determining the starting point and end point of the characteristic light rays;

S23, using the point-by-point method to calculate the coordinates and normal vectors of the data points used to construct the freeform surface; and S24, fitting the surface shape of the freeform surface according to the data points and calculating the spatial position of the freeform surface.

Figure 9:
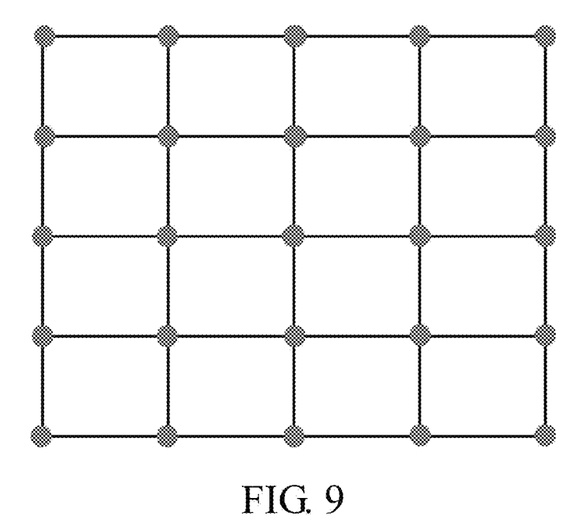
FIG. 9 shows a schematic view of the field of view selection when defining characteristic light rays in the second embodiment.

The first step of point-by-point construction is to define characteristic light rays, that is, to select light rays with different entrance pupil coordinates in multiple fields of view for point-by-point calculation. Since the nonsymmetric system does not have symmetry in the field of view, a full field of view design is required, as shown in FIG. 9. In one embodiment, the field of view is (0°, 0°), (0°, −3°), (0°, 3°), (4°, 0°), (4°, −3°), (4°, 3°), (−4°, 0°), (−4°, −3°), (−4°, 3°).

After defining the characteristic field of view, the pupil needs to be sampled, and a polar coordinate grid form can be selected to sample the pupil. In the point-by-point method, the more characteristic light settings are, the more accurate the freeform surface will be constructed. However, as the number of light rays increases, the amount of program calculation will increase. Therefore, when choosing the number of light rays to be used, the accuracy and the calculation amount of the program should be considered comprehensively.

Before starting the calculation and solving, it is necessary to determine the starting point and the end point of the characteristic light. The starting point can be the intersection of the characteristic light and any virtual surface before the first surface of the system, and the end point is the ideal image point. When the spatial position of the image plane is determined, the position of the ideal image point in the global coordinate system can be calculated according to the given object-image relationship, and the specific calculation method is shown in formula (1) and formula (2):

$$T_{n,ideal} = T * \begin{bmatrix} f\tan\omega_{n,x} \\ f\tan\omega_{n,y} \\ 0 \end{bmatrix} + \begin{bmatrix} x_{i,dc} \\ y_{i,dc} \\ z_{i,dc} \end{bmatrix}, \quad (1)$$

$$T = \begin{bmatrix} \cos(\gamma_i) & \sin(\gamma_i) & 0 \\ -\sin(\gamma_i) & \cos(\gamma_i) & 0 \\ 0 & 0 & 1 \end{bmatrix} * \\ \begin{bmatrix} \cos(\beta_i) & 0 & \sin(\beta_i) \\ 0 & 1 & 0 \\ -\sin(\beta) & 0 & \cos(\beta_i) \end{bmatrix} * \begin{bmatrix} 1 & 0 & 0 \\ 0 & \cos(\alpha_i) & -\sin(\alpha_i) \\ 0 & \sin(\alpha_i) & \cos(\alpha_i) \end{bmatrix}, \quad (2)$$

wherein T represents the rotation transformation matrix, f represents the focal length of the system, $\omega_{n,x}$ represents the field angles of the nth characteristic field of view in the X direction, $\omega_{n,y}$ represents the field angles of the nth characteristic field of view in the Y direction, and $T_{n,\,ideal}$ represents the coordinates of the ideal image point of the n-th characteristic field of view in the global coordinate system; $x_{i,de}$, $y_{i,de}$, and $z_{i,de}$ represent the eccentricities of the image plane in the X direction, the Y direction, and the Z direction; and $\alpha_i$, $\beta_i$, and $\gamma_i$ represent the tilt angles of the image plane. In one embodiment, $\gamma_i$=0°, and $\beta_i$=45°.

The first step of point-by-point construction is to define characteristic light rays, that is, to select light rays with different entrance pupil coordinates in multiple fields of view for point-by-point calculation. Since the nonsymmetric system does not have symmetry in the field of view, a full field of view design is required, as shown in FIG. 9. In one embodiment, the fields of view are (0°, 0°), (0°, −3°), (0°, 3°), (4°, 0°), (4°, −3°), (4°, 3°), (−4°, 0°), (−4°, −3°), and (−4°, 3°).

After the characteristic light and the starting point and end point of the characteristic light are determined, the point-by-point method can be started to calculate and solve. Through the point-by-point method, the coordinates and normal vectors of the data points used to construct the freeform surface can be calculated, and these data points will be used for freeform surface fitting. The freeform surface fitting refers to fitting the surface shape of the freeform surface and calculating the spatial position of the freeform surface. The common mathematical expression of freeform surface is to add freeform surface items on the basis of quadric surface, as shown in formula (3):

$$z(x, y) = \frac{c(x^2 + y^2)}{1 + \sqrt{1 - (1+k)c^2(x^2 + y^2)}} + \sum_{i}^{N} A_i g_i(x, y), \quad (3)$$

wherein c represents the surface curvature, k represent the quadric surface coefficient, Ai represent the freeform surface term coefficient, and gi(x,y) represent the freeform surface term described by Zernike polynomials, XY polynomials, etc. In one embodiment, an XY polynomial with the highest degree of 6 is used, and the XY polynomial is shown in the formula (4):

$$\sum_{i}^{N} A_i g_i(x, y) = A_{10}x^1 + A_{01}y^1 + A_{20}x^2 + A_{11}xy + \quad (4)$$
$$A_{02}y^2 + A_{30}x^3 + A_{21}x^2y^1 + A_{12}x^1y^2 + A_{30}y^3 + A_{40}x^4 +$$
$$A_{31}x^3y^1 + A_{22}x^2y^2 + A_{13}x^1y^3 + A_{04}y^4 + A_{50}x^5 + A_{41}x^4y^1 +$$
$$A_{32}x^3y^2 + A_{23}x^2y^3 + A_{14}x^1y^4 + A_{50}x^5 + A_{60}x^6 + A_{51}x^5y^1 +$$
$$A_{42}x^4y^2 + A_{33}x^3y^3 + A_{24}x^2y^4 + A_{15}x^1y^5 + A_{06}y^6.$$

The freeform surface shape of the meridian symmetric system only needs to be described by the even-order term of x in the XY polynomial, while the curved surface shape of the nonsymmetric freeform surface optical system can be described by all the terms in the first N-order. According to formula (3) and formula (4), when N=6, the degree of freedom of each curved surface in the meridian symmetric system is 14, and the degree of freedom of each curved surface of the nonsymmetric freeform surface optical system is 26. The available design freedom of the nonsymmetric freeform surface optical system is nearly doubled that of the meridian symmetric system.

Generally, the freeform surface shape is a change function of the surface vector height in the local coordinate system of the surface itself, such as formula (3) and formula (4). This change function needs to be fitted in the local coordinate system, and the coordinates and normal vectors of the obtained data points are in the global coordinate system. Therefore, it is necessary to perform the conversion between global coordinates and local coordinates first, that is, to determine the spatial position of the curved surface in the global coordinate system.

The conversion method between the global coordinates and local coordinates is: fitting data points on a reference quadric curved surface, wherein the radius of curvature, the position of the reference sphere center, and the quadric curved surface system can be effectively fitted by the least square method. The position of the curved surface in the off-axis optical system can be described by decenter and tilt. The essence is to determine a conversion method of the optical curved surface local coordinate system obtained by translation and rotation of the global coordinate system of the optical system. The origin G of the global coordinate is first translated to the local coordinate O, and then rotated around its own coordinate axis in a certain order, so that the local coordinate system is obtained. The angle of rotation is the tilt value need to calculate. The connection line between the center C of the reference sphere of the quadric surface obtained by fitting and the data point D of the chief ray of the central field of view on the surface to be fitted can be defined as the Z-axis of the local coordinate system. The intersection of the ray from the center C to the data point D and the fitting reference sphere can be defined as the origin of the local coordinate system O.

Figure 10:
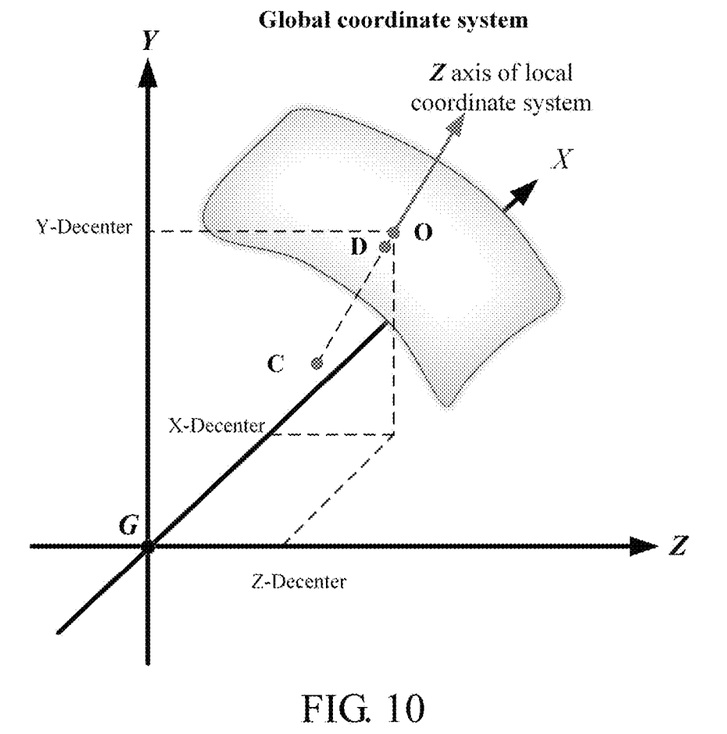
FIG. 10 shows a schematic view of the conversion between global coordinates and local coordinates in the second embodiment.

Referring to FIG. 10, G represents the global coordinate system, and the coordinate value of the origin O in the global coordinate system G is the decenter of the curved surface. The next step is to calculate the tilt of the curved surface, that is, to determine a way to rotate the global coordinate system in the Z direction to obtain the local coordinate system in the Z direction. In one embodiment, the rotation mode is that the YOZ surface of the global coordinate system is rotated by an angle of α around its X axis, and the XOZ surface of the obtained coordinate system is rotated by an angle of β around its Y-axis. At this time, the Z-axis direction is the same as the Z-axis direction of the defined local coordinate system. The sphere center coordinates of the quadric surface reference sphere in the global coordinate system is defined as C ($x_c$, $y_c$, $z_c$), and the origin of the local coordinate system is defined as O ($x_o$, $y_o$, $z_o$). According to the above translation and rotation methods, a kind of decenter and tilt of the curved surface can be calculated, the calculation formulas are shown in formulas (5)-(8):

$$(x_{de}, y_{de}, z_{de}) = (x_o, y_o, z_o), \quad (5)$$

$$d = \sqrt{(x_o - x_c)^2 + (y_o - y_c)^2 + (z_o - z_c)^2}, \quad (6)$$

$$\alpha = \arctan\left(\frac{y_o - y_c}{z_o - z_c}\right), \quad (7)$$

$$\beta = -\arcsin\left(\frac{x_o - x_c}{d}\right), \quad (8)$$

After the decenter and tilt values of the fitted curved surface are calculated, the conversion of the data point coordinates and normal vectors of the global coordinate system and the local coordinate system can be completed according to the rotation and translation relationship between the coordinate systems. The coordinates of a data point in the global coordinate system are defined as (x, y, z) and the normal vector is defined as (l, m, n), and the corresponding data point coordinates (x', y', z') in the local coordinate system and the normal vector (l', m', n') can be given by formulas (9)-(11):

$$T^{-1} = \begin{bmatrix} \cos(\beta) & 0 & -\sin(\beta) \\ 0 & 1 & 0 \\ \sin(\beta) & 0 & \cos(\beta) \end{bmatrix} * \begin{bmatrix} 1 & 0 & 0 \\ 0 & \cos(\alpha) & \sin(\alpha) \\ 0 & -\sin(\alpha) & \cos(\alpha) \end{bmatrix}, \quad (9)$$

$$(x', y', z') = (x - x_{de}, y - y_{de}, z - z_{de}) * T^{-1}, \quad (10)$$

$$(l', m', n') = (l, m, n) * T^{-1}, \quad (11)$$

wherein T-1 represents the inverse matrix of the rotation transformation matrix T.

After transforming the coordinates and normal vectors of the data points in the global coordinate system into the local coordinate system, the residual coordinates and normal vectors of the data points after removing the quadric surface can be calculated. The fitting method of data point coordinates and normal vectors is used to fit the residuals into freeform surface coefficients, thereby realizing the construction of the curved surface.

In fact, the definition of the local coordinate system of the nonsymmetric curved surface is not unique, and the Z-axis direction and rotation of the local coordinate system can be changed. A different local coordinate system is chose to change the coefficients of the freeform surface items obtained by subsequent fitting, but in fact the curved surface types described are the same. However, for different local coordinate systems, the degree of deviation between the reference sphere and the fitted freeform surface is different, and a small degree of deviation is beneficial to design and manufacturing. In addition, when determining the rotation mode, there can actually be rotation of the XY plane around the Z-axis, that is, γ is tilted. But this only adds a parameter without adding a new degree of freedom, and the accuracy of curved surface fitting is not improved. Considering comprehensively, the above-mentioned definition of the local coordinate system is the most suitable, and it is verified on a single nonsymmetric off-axis freeform surface that it can reach the diffraction limit after fitting.

Figure 11:
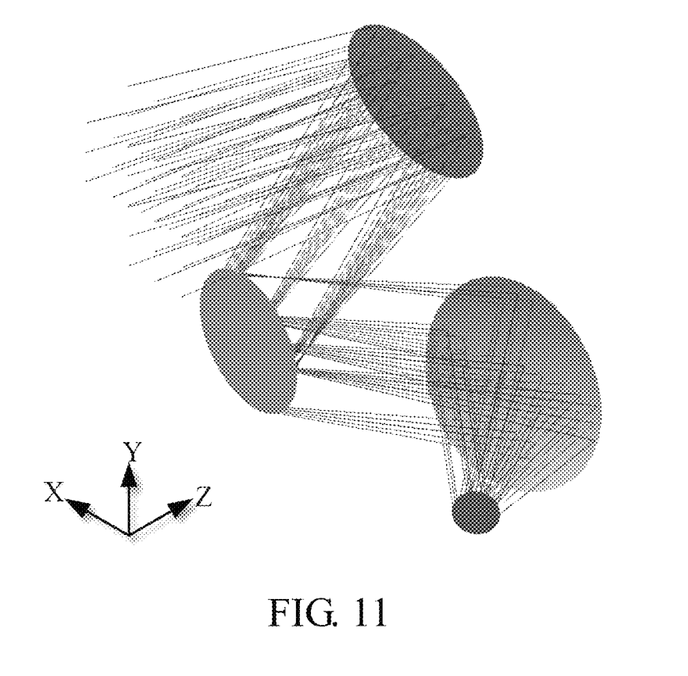
FIG. 11 shows schematic views of a structure and an optical path of the optical system after iteration in the second embodiment.
Figure 12:
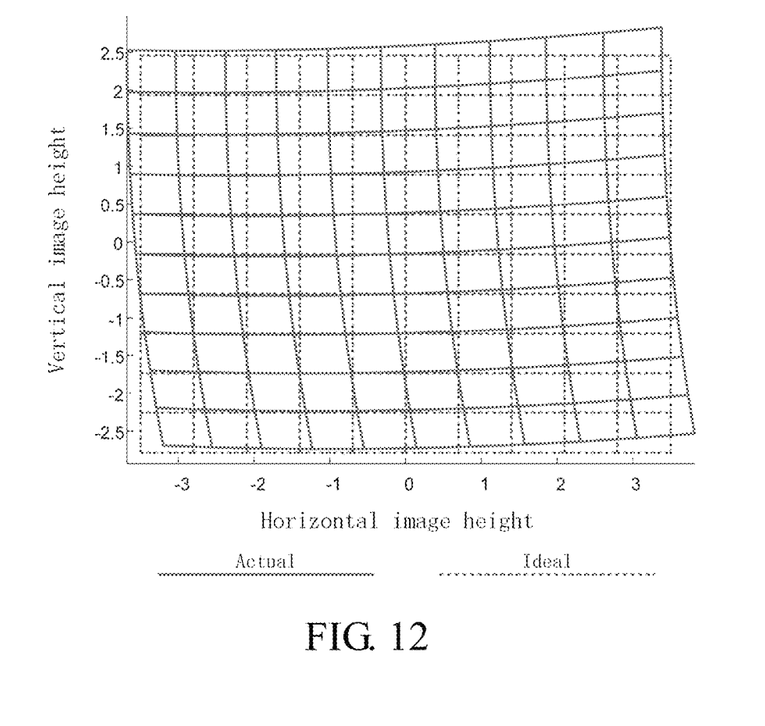
FIG. 12 shows a distortion network view of the optical system after iteration in the second embodiment.

Repeating the above freeform surface construction process can improve the imaging quality of the system and finally get a good starting point for optimization. The RMS error of the final iterated optical system is 0.5052. The optical path diagram of the system is shown in FIG. 11, the structure of the iterated system is consistent with the initial plane structure, the image plane of the iterated system has a β tilt of 45°, which is consistent with the expected off-axis three-mirror structure. FIG. 12 shows the distortion network diagram of the iterated system, wherein the solid line represents the actual image height, and the dotted line represents the ideal image height. Seen from FIG. 12, the iterated system can substantially achieve the given object image relationship.

During step S30, optical design software can be further used to optimize the iterated system. The distortion of the iterated system in FIG. 12 is neither barrel distortion nor pillow distortion, and the system has no symmetry in all directions. Therefore, the full field of view design should also be considered in the optimization process. In one embodiment, (0°, 0°), (0°, −3°), (0° 3°) (4°, 0°) (4°, −3°), (4°, 3°), (−4°, 0°), (−4°, −3°), and (−4°, 3°) these fields of view are used for optimization design, which are consistent with the sampling field of view used for initial system solution.

When optimizing the nonsymmetric system, it is necessary to control overall structure of the nonsymmetric system while ensuring that the system can achieve a given object-image relationship. Therefore, it is necessary to carefully give constraint condition. The distance between the chief rays of the four fields of view (4°, −3°), (4°, 3°), (−4°, −3°), and (−4°, 3°) and the chief rays of the central field of view (0°, 0°) on the image plane is used as the constraint condition of the image height, so as to realize the control of focal length and distortion. In addition, the ratio of the dimensions of the secondary reflecting mirror 104 in the meridian direction and sagittal direction is constrained to be close to 1, so as to ensure that the pupil is circular.

The position of the curved surface is fixed, and the radius of curvature of the curved surface and the quadric surface coefficient are set as variables for optimization. In the optimization process, the freeform surface coefficients of each curved surface are gradually added as variables. When a certain coefficients of the freeform items is added, the decenter and tilt of the curved surface can also be set as variables. The decenter and α tilt of the image surface are also set as variables, but in order to maintain the special requirements of the image surface, the β tilt of the image surface needs to be fixed at −45°. In this step of optimization, the spatial position of the curved surface will change, so some structural constraints of the system need to be added. The intersection of the chief ray of the central field of view on each curved surface is controlled to be located near the center of the curved surface, so as to ensure that the imaging uses the central area of the curved surface. In addition, it is necessary to control the specific light and the position of the intersection of the light on the image surface, so as to ensure that adjacent curved surfaces do not overlap, and to eliminate obstruction and maintain the special spatial structure of the system. In the optimization of the nonsymmetric system, the uncertainty of the position of the curved surface is large, so it is necessary to adjust the structural constraints in the optimization until the ideal system structure and system imaging quality are finally obtained. The optimized optical system structure and optical path schematic diagram are shown in FIG. 1 to FIG. 3.

Figure 13:
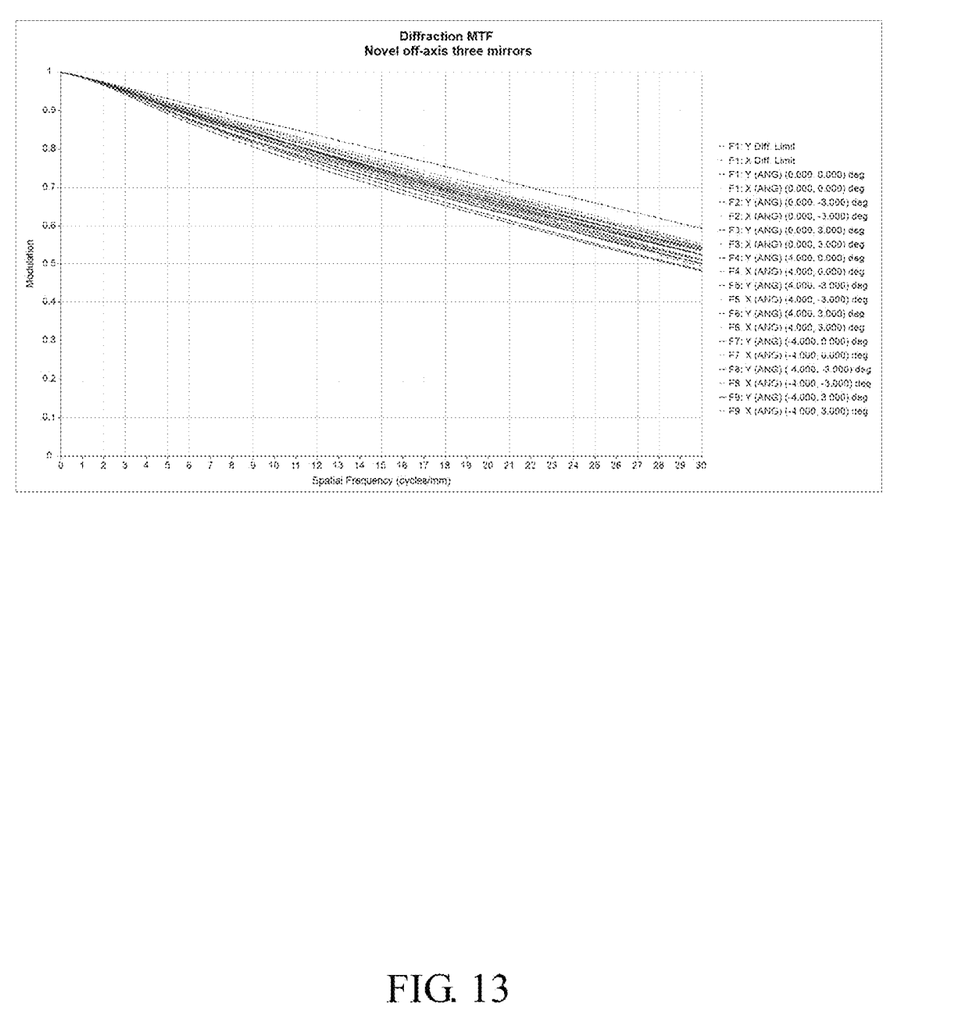
FIG. 13 shows a diffraction transfer function of the optimized optical system in the second embodiment.
Figure 14:
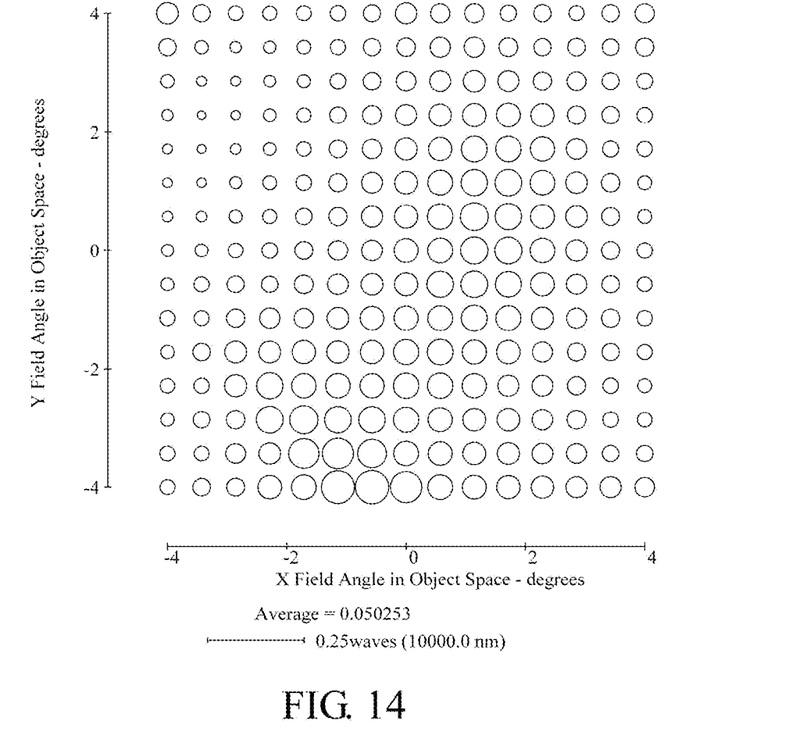
FIG. 14 shows a RMS wave aberration view of a field of view of the optimized optical system in the second embodiment.
Figure 15:
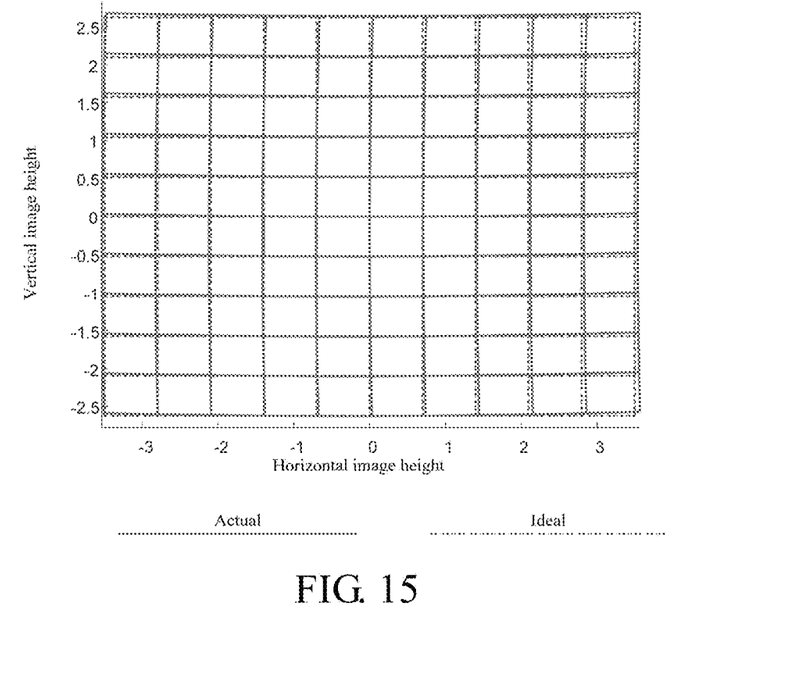
FIG. 15 shows a distortion network view of the optimized optical system of the second embodiment.

This embodiment further provides some performance parameters of the optimized optical system. FIG. 13 shows a diffraction transfer function of the optimized optical system in the second embodiment. FIG. 14 shows a RMS wave aberration view of the field of view of the optimized optical system in the second embodiment. FIG. 15 shows a distortion network view of the optimized optical system of the second embodiment.

The diffraction transfer function of the final optimized nonsymmetric freeform optical system is greater than 0.4 at 30 cycs/mm, the average value of the RMS wave aberration of the field of view of the optimized nonsymmetric freeform optical system at the wavelength of λ=10 μm is about 1/20λ, and the optimized nonsymmetric freeform optical system has good imaging quality. Compared with the optimized starting point, the distortion of the optimized nonsymmetric freeform optical system has been greatly improved, and the maximum relative distortion is less than 5%. The optimized system can achieve the expected object-image relationship. It can be seen that the nonsymmetric freeform surface optical system 100 can well realize the given object-image relationship and also has good imaging quality. In addition, the distortion network diagram of the nonsymmetric freeform surface optical system 100 deserves special attention, the distortion of the system in each direction is different, and the system is also nonsymmetric. In particular, seen from the distortion network diagram of the optimization starting point shown in FIG. 14, the distortion in each direction is quite different, which shows that an imaging optical system with a special object-image relationship can be realized.

After the step S30, the method for designing the nonsymmetric freeform surface optical system 100 further includes a step of processing according to the parameters of the system that satisfy the design requirements output in the step S30, thereby obtaining a physical element of the nonsymmetric freeform surface optical system 100. The physical element has a shape and is made of material, which is a physical element entity.

Compared with the prior art, the method for designing the nonsymmetric freeform surface optical system 100 has a greater degree of freedom in design, and the designed curved surface has fewer spatial position constraints, and more compact optical system with a specific special space structure can be designed.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A nonsymmetric freeform surface optical system, comprising:
a primary reflecting mirror;
a secondary reflecting mirror; and
a tertiary reflecting mirror;

a light beam from an object is reflected on the primary reflecting mirror to form a first reflected light beam, the first reflected light beam irradiates the secondary reflecting mirror and is reflected to form a second reflected light beam, the second reflected light beam irradiates the third reflecting mirror and is reflected to form a third reflected light beam, the third reflected light beam reaches an image surface to form an image, and the image surface has a β tilt of 45 degrees; and the nonsymmetric freeform surface optical system has no rotational symmetry and no meridional symmetry.

2. The nonsymmetric freeform surface optical system of claim 1, wherein the light beam in the nonsymmetric freeform surface optical system is three-dimensionally deflected.

3. The nonsymmetric freeform surface optical system of claim 1, wherein a dimension of the nonsymmetric freeform surface optical system in an X direction is 200 mm, a dimension of the nonsymmetric freeform surface optical system in a Y direction is 180 mm, and a dimension of the nonsymmetric freeform surface optical system in a Z direction is 180 mm.

4. The nonsymmetric freeform surface optical system of claim 1, wherein a field of view of the nonsymmetric freeform surface optical system is 8°×6°, a F-number of the nonsymmetric freeform surface optical system is 1.3, an effective focal length of the nonsymmetric freeform surface optical system is 50 mm, an entrance pupil diameter of the nonsymmetric freeform surface optical system is 38.5 mm, a working wavelength of the nonsymmetric freeform surface optical system is in a range from 8 μm to 14 μm.

5. The nonsymmetric freeform surface optical system of claim 1, wherein the nonsymmetric freeform surface optical system has off-axis in both a meridian plane and a sagittal plane.

6. The nonsymmetric freeform surface optical system of claim 1, wherein a diffraction transfer function of the nonsymmetric freeform surface optical system is greater than 0.4 at 30 cycs/mm.

7. The nonsymmetric freeform surface optical system of claim 1, wherein mirror surfaces of the primary reflecting mirror, the secondary reflecting mirror, and the tertiary reflecting mirror have not any rotational symmetry axis.

8. The nonsymmetric freeform surface optical system of claim 1, wherein mirror surfaces of the primary reflecting mirror, the secondary reflecting mirror, and the tertiary reflecting mirror have not any meridian symmetry plane.

9. A nonsymmetric freeform surface optical system, comprising:
a primary reflecting mirror;
a secondary reflecting mirror; and
a tertiary reflecting mirror;
a light beam from an object is reflected on the primary reflecting mirror to form a first reflected light beam, the first reflected light beam irradiates the secondary reflecting mirror and is reflected to form a second reflected light beam, the second reflected light beam irradiates the third reflecting mirror and is reflected to form a third reflected light beam, and the third reflected light beam reaches an image surface to form an image; the nonsymmetric freeform surface optical system has no rotational symmetry and no meridional symmetry, the image surface has a β tilt of 45 degrees, and the light beam in the nonsymmetric freeform surface optical system is three-dimensionally deflected; a dimension of the nonsymmetric freeform surface optical system in an X direction is 200 mm, a dimension of the nonsymmetric freeform surface optical system in a Y direction is 180 mm, and a dimension of the nonsymmetric freeform surface optical system in a Z direction is 180 mm; and a field of view of the nonsymmetric freeform surface optical system is 8°×6°, a F-number of the nonsymmetric freeform surface optical system is 1.3, an effective focal length of the nonsymmettic freeform surface optical system is 50 mm, an entrance pupil diameter of the nonsymmetric freeform surface optical system is 38.5 mm, a working wavelength of the nonsymmetric freeform surface optical system is in a range from 8 μm to 14 μm.

10. A nonsymmetric, freeform surface optical system, comprising:
a primary reflecting mirror;
a secondary reflecting mirror; and
a tertiary reflecting mirror;
a light beam from an object is reflected on the primary reflecting mirror to form a first reflected light beam, the first reflected light beam irradiates the secondary reflecting mirror and is reflected to form a second reflected light beam, the second reflected light beam irradiates the third reflecting mirror and is reflected to form a third reflected light beam, and the third reflected light beam reaches an image surface to form an image; mirror surfaces of the primary reflecting mirror, the secondary reflecting mirror, and the tertiary reflecting mirror have not any rotational symmetry axis; and the nonsymmetric freeform surface optical system has no rotational symmetry and no meridional symmetry.

11. The nonsymmetric freeform surface optical system of claim 10, wherein the image surface has a β tilt of 45 degrees.

12. The nonsymmetric freeform surface optical system of claim 10, wherein a dimension of the nonsymmetric freeform surface optical system in an X direction is 200 mm, a dimension of the nonsymmetric freeform surface optical system in a Y direction is 180 mm, and a dimension of the nonsymmetric freeform surface optical system in a Z direction is 180 mm.

13. The nonsymmetric freeform surface optical system of claim 10, wherein a field of view of the nonsymmetric freeform surface optical system is 8°×6°, a F-number of the nonsymmetric freeform surface optical system is 1.3, an effective focal length of the nonsymmetric freeform surface optical system is 50 mm, an entrance pupil diameter of the nonsymmetric freeform surface optical system is 38.5 mm, a working wavelength of the nonsymmetric freeform surface optical system is in a range from 8 μm to 14 μm.

14. The nonsymmetric freeform surface optical system of claim 10, wherein the nonsymmetric freeform surface optical system has off-axis in both a meridian plane and a sagittal plane.

15. The nonsymmetric freeform surface optical system of claim 10, wherein a diffraction transfer function of the nonsymmetric freeform surface optical system is greater than 0.4 at 30 cycs/mm.

\* \* \* \* \*